(12) United States Patent
Duyvesteyn et al.

(10) Patent No.: US 6,395,061 B1
(45) Date of Patent: May 28, 2002

(54) PROCESS FOR ORGANIC ACID BIOLEACHING OF ORE

(75) Inventors: Willem P. C. Duyvesteyn, Reno; Houyuan Liu, Sparks, both of NV (US)

(73) Assignee: BHP Minerals International Inc., Houston, TX (US)

( * ) Notice: Subject to any disclaimer, the term of this patent is extended or adjusted under 35 U.S.C. 154(b) by 0 days.

(21) Appl. No.: 09/748,917

(22) Filed: Dec. 27, 2000

Related U.S. Application Data (60) Provisional application No. 60/187,439, filed on Mar. 7, 2000.

(51) Int. Cl.$^7$ ................................................. C22B 3/18
(52) U.S. Cl. ................................. 75/712; 423/DIG. 17; 562/584; 75/743
(58) Field of Search ............. 75/743, 712; 423/DIG. 17; 562/584

(56) References Cited

U.S. PATENT DOCUMENTS

| | | |
|---|---|---|
| 3,873,424 A | 3/1975 | Kimura et al. |
| 4,031,038 A | 6/1977 | Grinstead et al. |
| 4,098,867 A | 7/1978 | Grinstead et al. |
| 4,098,870 A | 7/1978 | Fekete et al. |
| 4,110,400 A | 8/1978 | Jha et al. |
| 4,195,065 A | 3/1980 | Duyvesteyn |
| 4,243,498 A | 1/1981 | Sherwood et al. |
| 4,254,087 A | 3/1981 | Grinstead et al. |
| 4,374,101 A | 2/1983 | Lussiez et al. |
| 4,424,274 A | 1/1984 | Matsumoto et al. |
| 4,547,347 A | 10/1985 | Lussiez et al. |
| 4,547,348 A | 10/1985 | Lussiez et al. |
| 4,900,522 A | 2/1990 | Chou et al. |
| 5,571,308 A | 11/1996 | Duyvesteyn et al. |
| 5,626,648 A | 5/1997 | Duyvesteyn et al. |
| 5,944,872 A | 8/1999 | Chaney et al. |
| 6,245,125 B1 * | 6/2001 | Dew et al. ............ 423/DIG. 17 |

FOREIGN PATENT DOCUMENTS

| | | |
|---|---|---|
| FR | 2 028 429 A | 10/1970 |
| FR | 2 262 118 A | 9/1975 |

OTHER PUBLICATIONS

Database WPI, Section Ch, Week 199415, Derwent Publications Ltd., London, GB: Class D16, AN 1994–118842, XP002177751 & BR 9 203 400A (Biologica Desenvolvimento Projetos), Mar. 1, 1994 abstract.

Sukla L B et al.: "Bioleaching of Sukinda Laterite Using Ultrasonics", Hydrometallurgy, Elsevier Scientific Publishing Cy. Amsterdam, NL, vol. 37, No. 3, Apr. 1, 1995, pp. 387–391, XP000500797, ISSN: 0304–386X, p. 388; tables 1,2.

H.J. Roorda and P.E. Queneau, "Recovery of nickel and cobalt from limonites by aqueous chlorination in sea water," *Trans. Inst. Mining Metall.*, Sec. C, 82, pp. C79–C87, 1973, No month.

K. Alibhai, D.J. Leak, A.W.L. Dudeney, S. Agatzini and P.G. Tzeferis, "Microbial leaching of nickel from low grade Greek lateries," *Mineral Bioprocessing*, Ed. R.W. Smith and M. Misra, TMS, Warrendale, PA, pp. 191–205, 1991, No month.

(List continued on next page.)

Primary Examiner—Melvyn Andrews
(74) Attorney, Agent, or Firm—Brinks Hofer Gilson & Lione; G. Peter Nichols (57) ABSTRACT

A process for leaching an ore that contains nickel and magnesium includes mixing a microorganism that is capable of producing an organic acid, a nutrient, and an ore that contains nickel and magnesium for a period of time to dissolve the nickel and form a solution containing a nickel salt and a magnesium salt, separating the nickel from the magnesium in the salt solution.

20 Claims, 4 Drawing Sheets

OTHER PUBLICATIONS

P.G. Tzeferis, S. Agatzini and E.T. Nerantzis, "Mineral leaching of non–sulfide ores using heterotrophic micro–organisms," *Letters in Applied Microbiology*, 18, pp. 209–213, 1994, No. month.

L.B. Sukla and V. Panchanadikar, "Bioleaching of lateritic nickel ore using a heterotrophic micro–organism," *Hydrometallurgy*, 32, pp. 373–379, 1993, No month.

L.B. Sukla, V. Panchanadikar, R.N. and Kar, "Microbial leaching of laterite nickel ore," *World Journal of Microbiology and Biotechnology*, 9, pp. 255–257, 1993, No month.

K. Bosecker, "Leaching of lateritic nickel ore with heterotrophic microorganisms," *Fundamental and Applied Biohydrometallurgy*, Ed. R.W. Lawrence, R.M.R. Branion and H.G. Ebner, Elsevier, Amsterdam, pp. 367–382, 1985, No month.

K.A.K. Alibhai, et al, "Bioleaching and bioprecipitation of nickel and iron from laterites," *FEMS Microbilogy Reviews*, 11, pp 87–96. 1993, No month.

K. Bosecker, "Bioleaching of non–sulfide minerals with heterotrophic microorganisms," Proceedings of 8th International Biotechnology Symposium, Ed. G. Durand, L. Bobichon, J. Florent, SFM, Paris, pp. 1106–1118, 1988, No month.

P.G. Tzeferis, "Fungal leaching of nickeliferous laterites," *Folia Microbiology*, 39 (2), pp. 137–140, 1994, No month.

G. Joshi–Tope and A. Francis, "Mechanisms of Biodegredation of Metal–Citrate Complexes by *Psedomass fluorescens*," *J. of Bacteriology*, pp. 1989–1993, 1995, No month.

Y.–W. Chen, "Influence of Aluminum and Organic Acids on the Formation of Lepidocrocite and Goethite," *Taiwan Journal of Forest Science*, 14 (2), pp. , 1999, No month.

R.L. Chaney, Y.M. Li, S.L. Brown, J.S. Angle and A.J. Baker, "Use of improved hyperaccumulator plants to phytoremediate metal contaminated soils," Am. Soc. Agron. An. Meeting, St. Louis, MO, 1995, No month.

D. Mayiilvahanan, "Citric Acid Production," *Bioprocess Engineering*, 15, pp. 323–326, 1996, No month.

Y.D. Hang, "Microbial production of citric acid in fixed bed column bioreactors," *Biotechnology Letters*, 10(6), pp. 421–426, 1988, No month.

* cited by examiner

PROCESS FOR ORGANIC ACID BIOLEACHING OF ORE

This application claims priority from Provisional application Ser. No. 60/187,439, filed Mar. 7, 2000.

The proposed invention relates to a synergistic process involving simultaneous production of organic acids and leaching of nickel and other base metals from ores and waste products. In particular, the present invention relates to a combination of citric acid production process with a metals leaching and recovery process to yield a synergistic and low cost opportunity with significant economic potential.

With fewer high-grade nickel resources being discovered, the development of alternative technologies has become the primary goal of the nickel production industry. The natural resources that are mined for nickel production include ores where the nickel originates from a magmatic source and, therefore, is tied up with sulfur in (mixed) sulfide ores. Sulfide ores are generally rather deeply located and often underground mining is required to obtain them. These resources range in grade from 0.5% to about 2% Ni. Non-magmatic nickel resources are the so-called nickel laterites. These consist of weathered ultra basic rocks in which the low level nickel concentration of the parent rock is concentrated to economic values through geological weathering processes, resulting in heterogeneous mixtures of hydrated iron oxides (goethite) and hydrous magnesium silicates, which both contain low concentrations of nickel and cobalt. Since laterites are generally surface or near-surface deposits, low cost open cut mining techniques are used to mine the ore.

Laterite ore bodies generally consist of two main zones: a high-iron limonitic zone with about 1.3% Ni and 0.1% Co and a lower silicate ore zone, called saprolite, where continued weathering takes place with nickel values as high as 3%, but with little cobalt. In the transition from the limonitic zone to the saprolite zone, a third, relatively minor ore occurs, consisting of various magnesium silicate clays. All three of these ore types contain considerable amounts of absorbed water, typically 35 to 50 percent by weight, which has an important effect on the processing method.

In the upper or limonite zone, the nickel is present in the iron oxide phase. A separate nickel phase has never been identified. It is not completely clear whether the nickel is chemically bound in the goethite (FeOOH) matrix or adsorbed onto the surface. In the lower or saprolite zone, the nickel tends to be concentrated in a weathering product, mainly serpentine, or $(Mg,Ni)_3(Si_2O_5)(OH)_4$, and other magnesium silicate minerals, with nickel partially replacing magnesium.

Typical chemical compositions of the three types of ores are given in Table 1. Since the transition and the saprolite zones have a similar weathering profile involving the conversion of nickeliferous silicates to iron oxides, the two profiles are usually combined.

TABLE 1

Chemical compositions of laterite deposits.

|  | wt. % Ni | wt. % Fe | Wt. % MgO | Wt. % $SiO_2$ |
|---|---|---|---|---|
| Limonite zone | 0.8–1.5 | 40–50 | 0–5 | 0–10 |
| Transition zone | 1.5–1.8 | 25–40 | 5–15 | 10–30 |
| Saprolite zone | 1.8–3.5 | 10–25 | 15–25 | 30–50 |

Geologists are not certain how nickel and magnesium are transported during the weathering ("lateritization") process, but it is generally believed that a low pH is required. Carbonic acid has been thought of as the chemical that could supply the required hydrogen ions as well as provide for the low pH. However, carbonic acid by itself does not generate pH values lower than around 4.5. This may not be adequate for the chemical weathering process. It is now being postulated that both the cation ion (H+) as well as the anion of the acid must play a role in mineral dissolution and element transport and is facilitated by metal complexation rather than as free positively charged ions ($Ni^{2+}$ and $Mg^{2+}$). Weathering by itself also happens in an environment where vegetation and its breakdown products will play a complementary role in the mineral weathering process. Organic material is readily converted by bacteria and other organisms to organic acids such as humic and other carboxylic acids. Some plants can actually act as metal accumulators, especially when they metabolize with water that contains organic anion-complexed metal ions.

Since, relative to the underlying bedrock, nickel is enriched in the limonite and serpentine phases during lateritization, the basis of this invention is the reverse of the chemical reaction that resulted in the formation of an ore with an economic nickel content. In other words, the process according to the present invention seeks to reverse what Mother Nature has previously done: de-adsorb the nickel from its ore. In essence a possible reaction mechanism can be written as follows:

$$serpetine + 2\ Me^{x+} = magnesium\ silicate + xNi^{2+}\ or$$

$$(Mg,\ Ni)_3(Si_2O_5)(OH)_4 + \frac{3}{y} Me_y^{2+}L_2^{y-} =$$

$$(Mg,\ Me)_3(Si_2O_5)(OH)_4 + \frac{3}{y} Ni_yL_2^{y-}$$

where "L" represents an organic anion, such as citrate.

Figure 5:
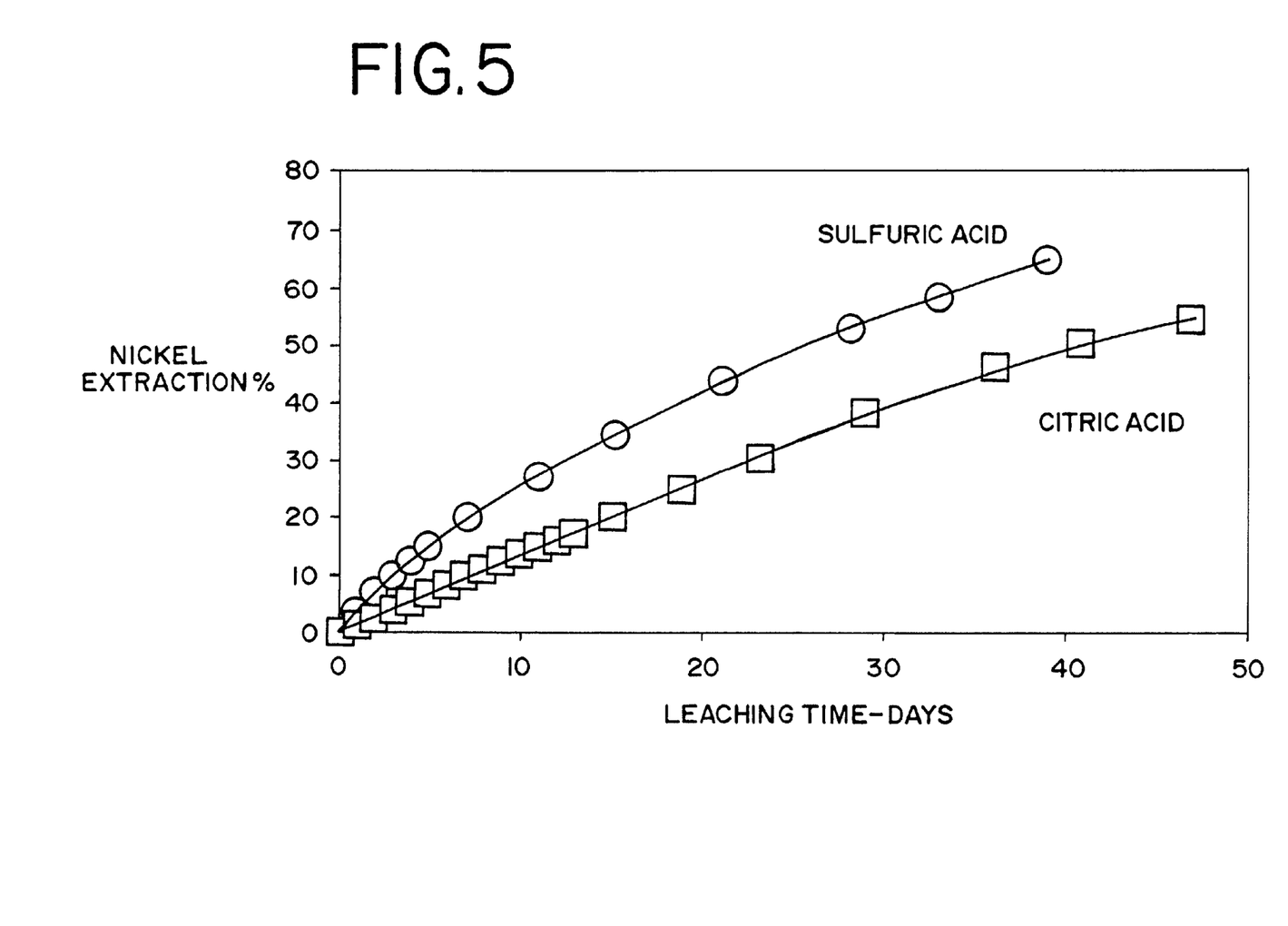
FIG. 5 is a graph that shows acid leaching of laterite nickel ore.

The technical viability of using organic acids to dissolve nickel from laterite ore is shown in FIG. 5 where a comparison between atmospheric sulfuric and citric acid leaching is made.

To address the issues of the low Ni grades of many laterites, cost-effective processing, and environmental concerns, the use of heterotrophic microorganisms for microbial leaching of nickel from lateritic ores has been investigated. The work has generally focused on leaching with fungi related to the Aspergillus and Penicillium genera. These types of fungi produce hydroxy-carboxylic acids such as citric acid and oxalic acid as metabolites, which have shown to be able to dissolve nickel, cobalt, and iron from a variety of laterite ores. While work has been done to determine the effectiveness of some heterotrophic bacteria for nickel leaching, the bacteria were found to be much more easily affected by nickel poisoning than the fungi.

Heterotrophic microorganisms are different from autotrophic microorganisms in that they require organic carbon for growth rather than carbon dioxide. Also, they do not directly degrade the mineral, but rather the degradation is achieved via the production of acid metabolites, such as citric acid and oxalic acid. It is thought that the metal extraction by microbially produced acids occurs through two mechanisms, which can take place separately or simultaneously. The first mechanism involves the displacement of metal cations from the ore matrix by hydrogen ions, resulting in dissolution of the metal ions, while the second is thought to be based on the ability of the organic acids that are produced to form soluble complexes with the metal ions by chelation.

By using an organic acid lixiviant to solubilize base metals rather than conventional mineral acids, environmental issues related to contamination of heaps, tailings and soils will be minimized. Neutralization of any residual acid may not be required as microbes can readily oxidize the remaining organic acid.

Therefore, the objects of the present invention are to provide a bioleaching process for nickel from lateritic ores; and to provide a process of acid production—in-situ or ex-situ—and method for recovering metals.

SUMMARY

The present invention provides a process for the co-production of citric acid and solublized metals, particularly nickel and cobalt. According to the process of the present invention, a microorganism, capable of producing an organic acid selected from the group consisting of oxalic acid, humic acid, citric acid, and mixtures thereof, is mixed with an ore containing a base metal, preferably at least nickel and optionally cobalt. The mixing occurs under conditions to leach the nickel from the ore to produce a solution rich in nickel. The solution preferably contains a nickel salt and a magnesium salt. The nickel salt can be separated from the magnesium salt and thereafter, the nickel can be recovered in any suitable known manner. The organic metal salt produced as a result of the mixing can be either sold or used and converted into an organic acid.

In one embodiment of the present invention, a microorganism capable of producing an organic acid selected from the group consisting of oxalic acid, humic acid, citric acid, and mixtures thereof, is mixed with a nutrient and an ore. While mixing, the microorganism produces an organic acid, which when produced, leaches base metals from the ore. The leached metals are recovered in any suitable known manner. The organic anion can be recovered while the leach solution (i.e., the microorganisms and nutrients), which is now barren, can be recycled and mixed with fresh microorganism, nutrient, and ore.

In a preferred embodiment, the microorganism produces citric acid in an indirect fashion and then leaches nickel and other metals from the ore. The nickel is recovered in a known manner. Likewise, the citric acid, which leached the nickel, also leached magnesium oxide present in the ore to produce magnesium citrate, which can be recovered or further treated to produce citric acid crystals and magnesium oxide for commercial sale. As a result, the process of the present invention provides a complete, economical, and environmentally friendly process for obtaining nickel from ore.

Unless otherwise noted, all percentages are by weight.

DETAILED DESCRIPTION OF THE INVENTION

Figure 4:
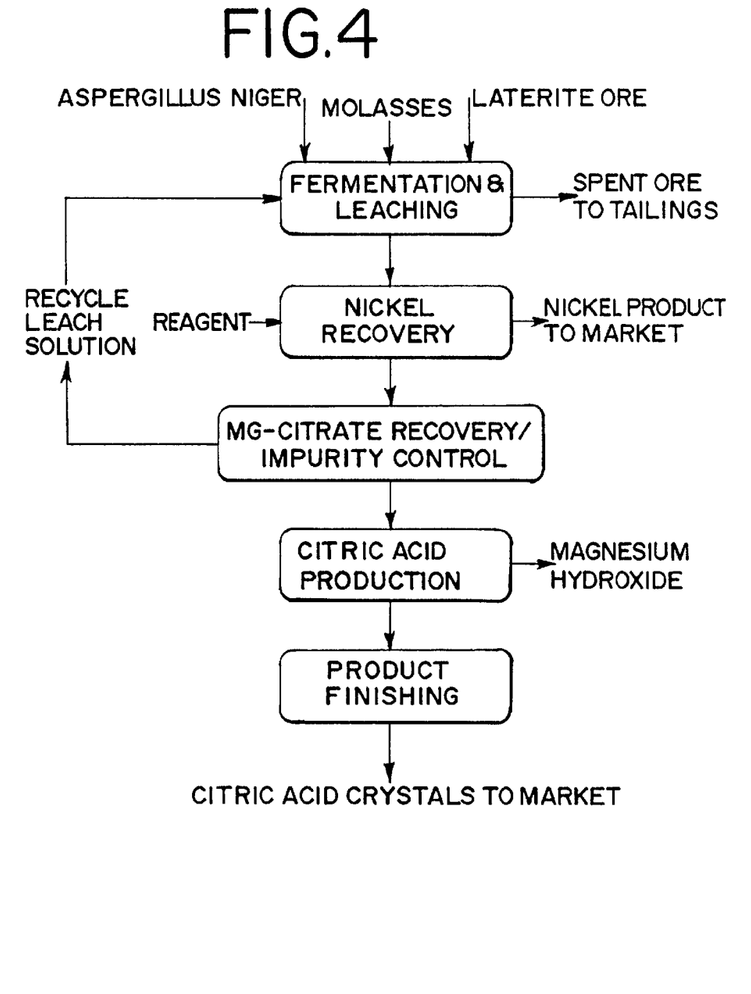
FIG. 4 shows a process flowsheet according to one embodiment of the present invention. It shows the co-production of citric acid and metals.

Turning now to FIG. 4, one embodiment of the present invention is shown. In this embodiment, the production of citric acid is combined with the leaching of a base metal-containing ore. Both base metal and the acid consuming magnesium are dissolved and, after base metal recovery, the magnesium citrate is either sold as is, or converted into citric acid. The conversion of citric acid can be accomplished in a number of ways, such as ion exchange and electrodialysis, with electrodialysis being preferred. Desirably, a recycle solution is added to the blended material to facilitate a leaching environment. The recycle solution consists essentially of a spent solution containing residual amounts of metals (nickel, magnesium and cation impurities) and low grade citric acid and residual citrate. For example, some nickel, magnesium, and other elements as well as a low grade waste acid can be recycled.

More specifically, the process of the present invention involves mixing a microorganism, a nutrient, and ore in a fermentation and leaching step.

Figure 1:
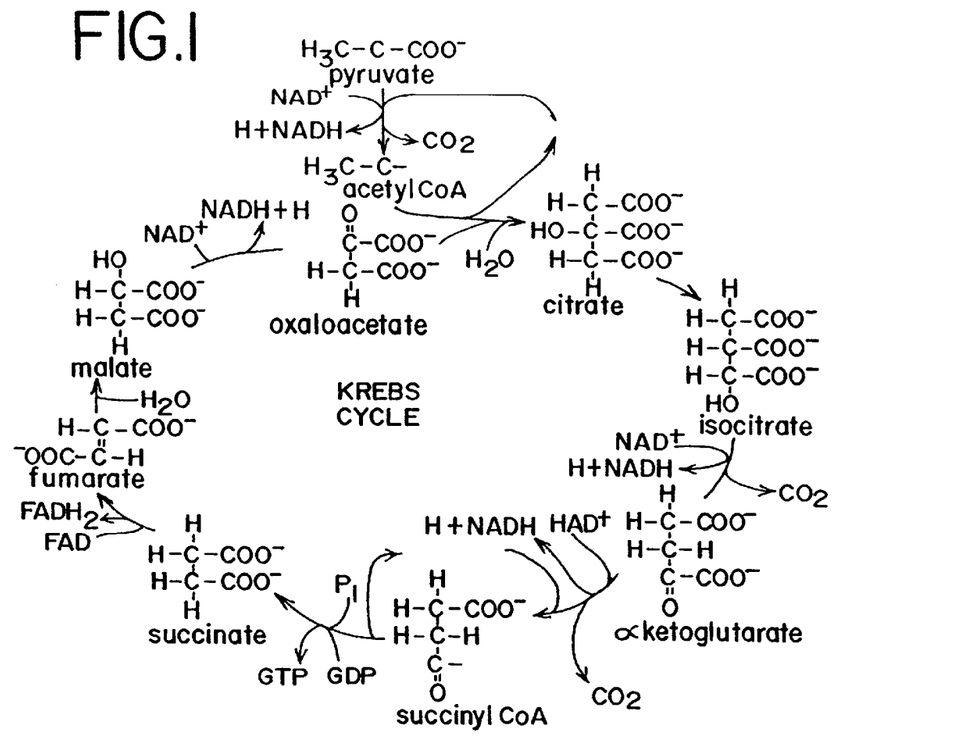
FIG. 1 shows a schematic of the metabolic Krebs cycle indicating production of organic acids.

Preferably, the microorganism is *Aspergillus niger*, which is known to produce citric acid. Citric acid is one of the few fine chemicals that are produced by fermentation. Citric acid (2-hydroxy-1,2,3 propane tricarboxylic acid) is an intermediate metabolic product of oxidative dissimilation of sugar and it is produced through the formation of pyruvic acid. In 1937, H. Krebs proposed a di- and tri-carboxilic acid metabolic scheme, as depicted in FIG. 1.

Figure 2:
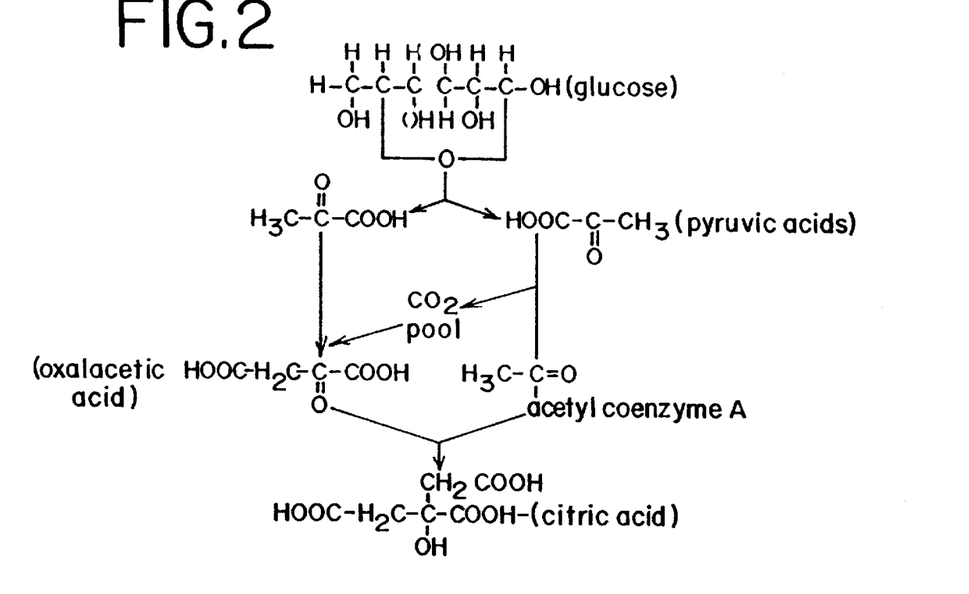
FIG. 2 shows a schematic of the conversion of glucose to citric acid.

To accumulate citric acid as the main or only product, the Krebs cycle must be broken at the point where citric acid is formed and destruction of citric acid must be minimized. Regulating the pH or adding a specific enzyme inhibitor to the medium can achieve this. The addition of a basic material such as lime can regulate the pH. Preferably, the pH is regulated by adding ore, e.g., laterite ore. There are essentially two processes for the production of citric acid: the surface route and the submerged route. Each process is carried out in dilute, sterile aqueous carbohydrate solutions containing the necessary nutrients and additives. Special strains of *Aspergillus niger* are used at approximately room temperature. With *Aspergillus niger* the conversion of glucose to citric acid takes place according to the schematic in FIG. 2.

Other microorganisms generally produce a lower yield of acid as compared to the various strains of *Aspergillus niger,* Aaureus, Awamori, Carbonarius, Cinnamomeus, Clavatus, Fenicis, *Fonsecaeus foetidus, Fumarious luchensis,* Saitoi, Usamil, and Wentii. Other organisms that have been reported for the citric acid production include: *Yarrowia lipolytica, Candida lipolytica,* and *Candida guilliermondi.* Currently, the preference seems to be for the submerged-culture process, especially in large volume production because it requires less labor and is easier to maintain aseptic conditions in industrial operations. On the other hand, the submerged-culture process requires higher power input and stringent control of the purity of the nutrient, e.g., sugar solution that is very critical to the citric acid yield. Some citric acid producers even use both processes.

Figure 3:
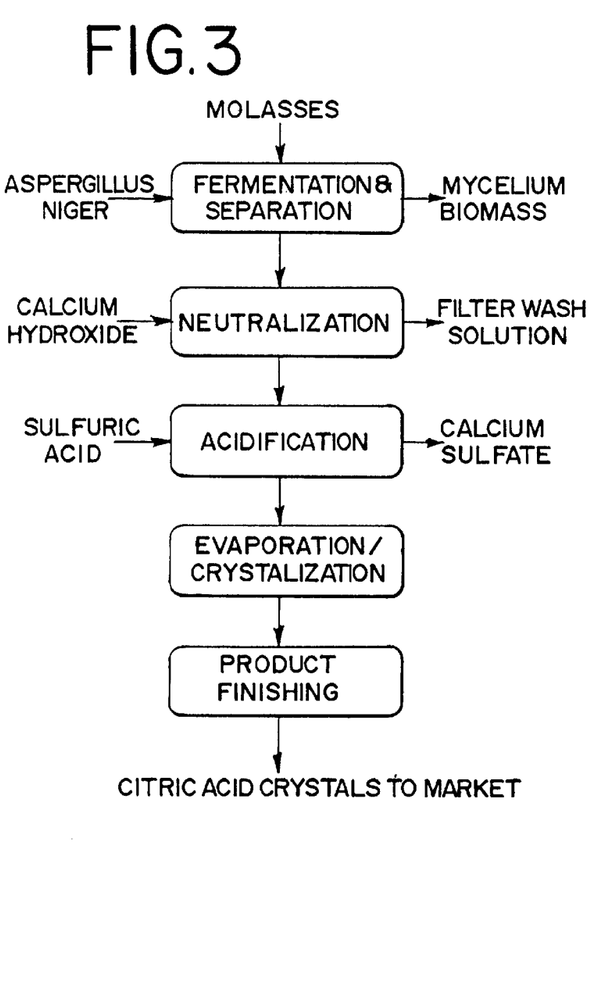
FIG. 3 shows a process flowsheet for conventional production of citric acid.

The overall process of producing citric acid by the submerged-culture method is shown in FIG. 3. A carbohydrate source such as molasses or other sucrose source is fermented under controlled conditions. The citric acid in the fermentation broth is neutralized with lime and a clear calcium citrate solution is obtained. The solution is re-acidified with sulfuric acid, gypsum is separated and the citric acid solution is concentrated and crystallized to a salable product.

The carbohydrates used in commercial citric acid fermentation are mainly industrially purified cane and beet sugars, including the various molasses. In the United States, the most commonly used carbohydrate sources are beet molasses and dextrose hydrolyzed from cornstarch.

In citrate synthesis, biomass growth is the critical factor as uncontrolled growth results in poor yields. Investigations have shown that the optimum pH for growth is 6.0 and for citrate production 3.0. Therefore, the process of the present invention is preferably conducted in a pH range from about 1 to about 7. The optimum operating temperature has been established to be 30° C. Initial pH, temperature, concentration, and type of organic carbon, as well as nutrients such as nitrogen, phosphate, and trace elements (Mn, etc.), play important roles in maximizing yields. The concentration of citric acid in the fermentation broths is governed by the initial amount of molasses. Broth concentrations of 60 gpl citric acid (0.3 M) have been readily produced. The only expense is the rather long batch fermentation period of about 8 days. In a continuous, countercurrent system this time can be substantially reduced.

Fermentation can also be carried out in aerated, solid substrate, fixed column reactors. Typically, a column reactor consists of an open pipe reactor with the solid substrate positioned on a screen through which aeration is carried out. This fermentation method is an alternative to regular surface fermentation methods, which require a significant surface area. The kinetics of citric acid production increase significantly in fixed-bed column reactors. Aeration of the fixed-bed column reactor is an important variable as it supports the aerobic growth of the microorganism by removing the metabolic heat that is produced during the chemical reaction and at the same time maintaining a temperature that maximizes acid production. Studies have shown that 30° C. is a significantly better operating temperature than 25° C. This work also shows that the rates of sugar consumption and citric acid production were highly dependent upon the moisture content of the column, with the rates at 50–60% moisture per dry weight (d.w.) being significantly better than at 40% moisture.

Thus, there are advantages to the production of citric acid in a "heap leach" column reactor, in which the nickel ore consumes the acid as it is being produced. In addition, the process provides an excellent opportunity to control the chemical reaction rate for acid formation and, hence, also for leaching of ore. It has also been shown that the citric acid production rate is not significantly affected by the amount of inoculum used (between 0.5 and 2 g per kg of carbon source). This is a very important result for the in situ citric acid production approach. As only 1 kg of inoculum is needed per ton of nickel ore, blending of the inoculum with the ore should not be a significant obstacle.

According to the present process, two different approaches for contacting the ore with the organic acids are provided. The first combines the ore directly with nutrients and microorganism in one reactor (either a stirred reactor or heap configuration). If the presence of trace elements has an adverse effect on the organism and the organic acid production in a direct configuration, the separate production of a citric acid fermentation broth for leaching in a stirred reactor or a stationary heap may be used (the indirect approach).

A further variation of the indirect approach is in situ leaching of an ore deposit such as a nickel laterite deposit. Most of these deposits are highly weathered, and as a result they have a very high porosity and permeability. While regular ultra-basic rock, such as magnesium silicate, has an in situ density of around 2.8 ton/nm$^3$, the laterites have bulk densities that range from 0.8 to 1.5 ton/nm$^3$. Since solutions can readily penetrate and migrate throughout the ore zones, resulting in the weathering phenomenon, the "forced weathering" using an acid more powerful than carbonic acid should produce a nickel laden solution. The viability of in situ "forced weathering" is, to a large extent, governed by the ability to recover the lixiviant solution to minimize contamination of the water table. Since organic acids have an anion that is readily biodegradable, environmental issues can be more readily addressed with organic acid than with mineral acid systems. Some preliminary data presented in the following table clearly demonstrates the ability of *Aspergillus Niger* to concurrently produce organic acid and leach nickel from a laterite ore.

| Ore | Test | Medium | Nickel Extraction | Days |
| --- | --- | --- | --- | --- |
| Saprolite ore A - 1.8% Ni | Shake Flask | Sucrose | 34 | 28 |
| Saprolite ore B - 1.8% Ni | Shake Flask | Sucrose | 38 | 32 |

In the conventional citric acid production process (FIG. 3), the production of citrate is maximized by maintaining the pH in the range of 2–3. Since growth is optimal at a pH of 6, excess citric acid is preferably neutralized to minimize the reaction time. Lime is generally used as a neutralizing agent at a rate of about 0.4 tons of CaO per ton of citric acid. In the pressure and atmospheric leaching of nickel from laterite ores, the consumption of mineral acid ($H_2SO_4$) ranges from 0.4 to 0.8 tons of acid per ton of ore. Since $H_2SO_4$ has about 30% more protons per ton of acid than citric acid, the equivalent acid requirement as citric acid should be increased by 30% to 0.52 to 1.04 tons of citric acid per ton of ore. Alternatively, this can be expressed in terms of lime consumption for citric acid manufacture: from 0.96 to 1.92 tons of neutralization agent in the form of laterite ore is required per ton of acid production. While this is about four times the amount of lime required, there is no cost involved in purchasing the neutralization "reagent".

Accordingly, in the process of the present invention, the ore is used as the neutralizing agent and results in a citrate product in the form of a mixed Mg, Fe, and Ni citrate solution, instead of calcium citrate when lime is used. Consequently, citrate recovery can readily be achieved by solution purification techniques that are common in the mineral industry: solvent extraction, ion exchange, or precipitation.

The nickel citrate solution can be directly processed in a nickel recovery step to recover as electrowon nickel metal. The magnesium citrate can likewise be processed in a magnesium citrate recovery step to produce magnesium citrate for commercial use. Alternatively, the present process contemplates the conversion of magnesium citrate into citric acid and magnesium hydroxide in a conversion or salt splitting step. The citric acid can then be finished in finishing step to make food-grade citric acid. Alternatively, the citric acid can be recycled and mixed with the microorganism and nutrient or with the microorganism, nutrient, and ore.

The magnesium citrate can be converted into citric acid and magnesium hydroxide by salt splitting of magnesium citrate. Electrodialysis ("ED") has been investigated for the use of salt splitting of inorganic and organic salts. Using ED for salt splitting obviates the need for sulfuric acid to convert the calcium citrate to citric acid. A significant factor in the production cost for ED is the quality of the acid produced. Since part of the acid can readily be recycled to the nickel leaching facility, total citric acid recovery through ED is not a prerequisite.

Since most of the citric acid production is carried out using equipment and facilities that are required for recovery of nickel anyway, the process of the present invention provides an elegant synergistic and low cost route. The main operating cost component no longer consists of sulfuric acid and lime, but with this modified route the organic nutrient source becomes the most significant cost item.

With the conventional citric acid route, the acid is produced from the calcium citrate solution by means of acidification with $H_2SO_4$. It has been estimated that at least 0.8 ton of sulfuric acid is required per ton of citric acid. The resulting byproduct, gypsum, also requires disposal.

Currently, citric and other organic acids are produced primarily using biotechnology based upon the fermentation of organic carbon sources. To accumulate citric acid, the Krebs cycle must be broken at the point where the acid is initially produced, otherwise it will be consumed once again. This destruction can only be stopped by using complexing or precipitating agents or decationizing the fermentation broth. Rather than using lime or ion exchange resins to facilitate the breaking of the Krebs cycle, nickel and other metal containing ores (especially those ores that contain magnesium) can be used for complexing and acid precipitation. While various organisms exist that produce organic acid by fermentation, no work has ever been undertaken to optimize the selection procedure with the goal of leaching of an ore instead of maximizing acid production. Ores contain a variety of chemical elements that can either function as micronutrients or potential "poisons."

Generally, therefore, one embodiment of the present application is directed to bio-assisted atmospheric heap leaching where a large tonnage heap of ore, the organic carbon source and organism are pre-blended with the ore.

Figure 6:
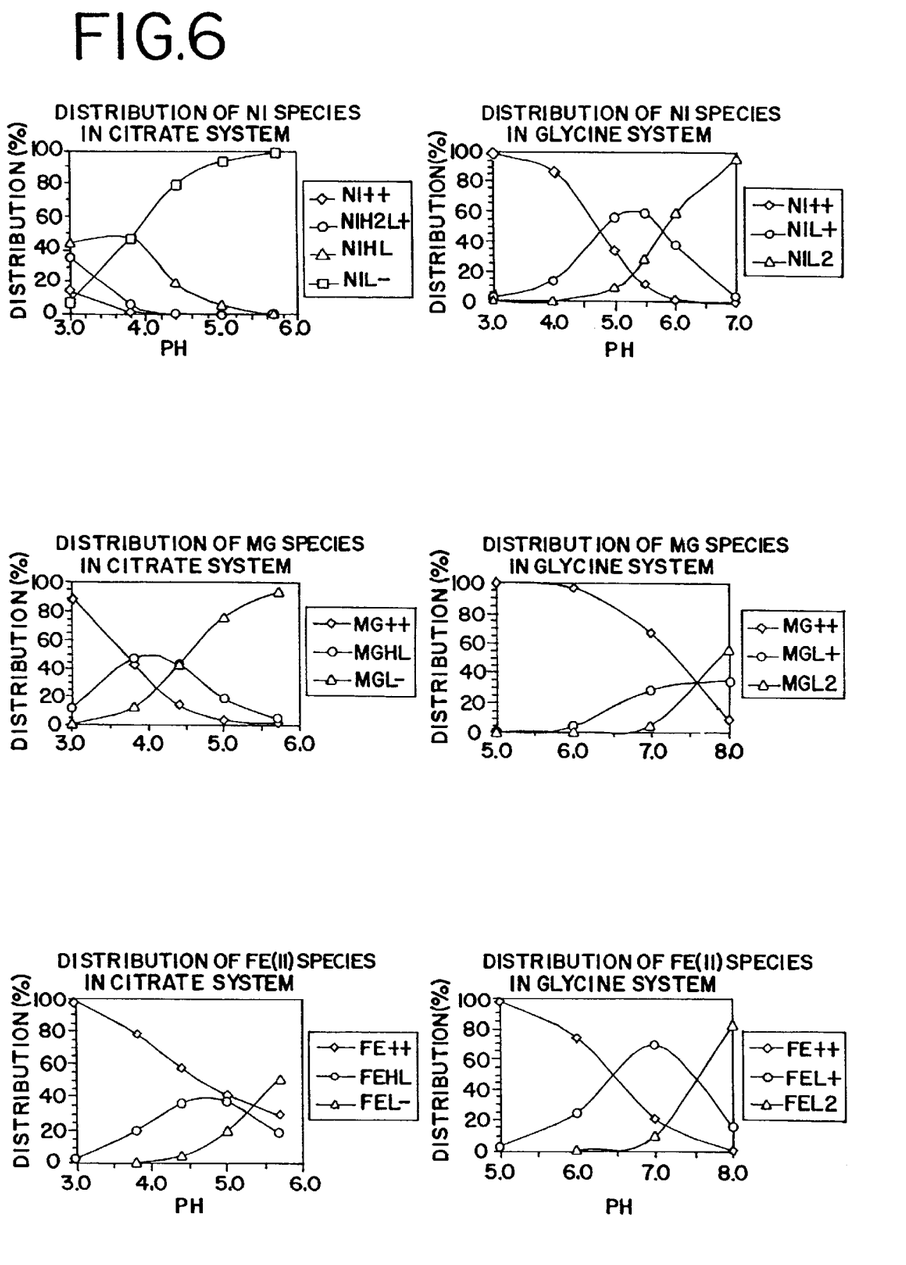
FIG. 6 shows simplified speciation diagrams for nickel, magnesium, and iron with citrate and glycine.

In order to understand the organic leaching of laterite ores, it is desirable to investigate the equilibrium state of the organic acid-ore leaching system based upon the thermodynamics. To be able to predict the speciation of the system and how changes in the system conditions influence this speciation requires determination of the cumulative formation constants. FIG. 6 shows the speciation of nickel, magnesium, and iron, which are the three most important elements with respect to leaching, in the presence of two different ligands, citrate and glycine. This will help in predicting the selectivity of nickel and other metallic ions under atmospheric leaching (heap leaching or agitation leaching) and multi-ions existing conditions.

Of particular importance is the development of an understanding of the nature of the complexes that are formed. Many citrate complexes are polydentate in nature, which results in sequestration of metal ions. The structure of these complexes may promote limited solubility and slow recovery rates. These effects might be countered by the presence of an additional ligand source to satisfy the metal's co-ordination capacity without citrate bridging. Small additions of four or five member bidentate or monodentate ligands might be used to disrupt the aggregation. Alternatively, operation of the leaching conditions in an acid range to avoid the citrate tri-anion would provide extra citrate as the bridge cleaving ligands but at the expense of lower pH.

The rate of citric acid leaching of Ni from laterite ore has been shown to be slow but steady with recovery that is linear with time, as shown in FIG. 5. Citric leaching does not normally exhibit this typical diminishing rate recovery curve, and at this time no explanation can be given for this result. There appears to be a solubility limitation for the nickel complex that is surprisingly low for such a highly functionalized ligand. If solubility is the main limiting feature in recovery, then an accumulation of "surplus" citrate complexes will form within leach columns. This accumulation of citrate should be able to be recovered by washing rather than by addition of more active leachant. Recovery may in fact speed up as common ion effect is diminished.

By understanding the characteristics of the nickel citrate complexation system, the process conditions can be optimized for maximum nickel leaching. As other divalent metals, such as zinc, copper and cobalt would be expected to behave similarly, understanding the nickel systems opens up possibilities for the application of organic acid leaching for other base metals.

Optionally, the citrate chemicals or citric acid are sold or reused. The most effective method for recovering the nickel or other metals leached as citrate complexes would involve an extraction agent that totally replaces the citrate ligands. This would directly regenerate a metal-depleted citric acid liquor for further use in leaching. Alternatively, the citrate complexes could readily be converted into a salable byproduct, such as calcium citrate, magnesium citrate, or citric acid.

The present invention therefore contemplates two methods for processing laterite ores: two stage leaching or in situ leaching. In two stage leaching, microorganisms first produce the acid metabolites, which are collected and then the leaching is performed with the collected acids. Because the optimal conditions for acid production by the microorganism are not necessarily the same as those required by leaching, this approach allows each to be optimized separately. Accordingly, in this embodiment the ore or substrate material is formed into two separate reactors or heaps with one reactor used to produce an organic acid solution using substrate material and with the organic acid solution from the first reactor used to contact the ore in the second reactor.

In another embodiment of the present invention, either or both of the reactors are heaps.

In the second approach the bioleaching is performed with the microorganisms being in direct contact with the ore, meaning that the acid production and leaching will occur under the same conditions.

The proposed biodegradable process according to the present invention has the potential to supplant environmentally disruptive ones currently used in the minerals industry to produce nickel, a strategically important and highly valued commodity, and synergistically produce calcium and magnesium citrates that can be purified to USP grade for use in the food industry. Organic acids are readily biodegradable and, thus, their use in the processing and recovery of metals, the environmental issues resulting in the "contamination" of heaps, tailings and soils will be significantly reduced as compared to mineral acid leaching, resulting in a lowering of cost associated with decommissioning of mining sites and remediation of contaminated sites.

It should be understood that a wide range of changes and modifications could be made to the embodiments described above. It is therefore intended that the foregoing description illustrates rather than limits this invention, and that it is the following claims, including all equivalents, which define this invention.

What is claimed is:

1. A process for leaching an ore that contains nickel and magnesium comprising:

a. mixing i. a microorganism that is capable of producing an organic acid, ii. a nutrient, and iii. a material selected from the group consisting of a substrate, an ore that contains nickel and magnesium, and mixtures thereof to form a mixture;

b. allowing the mixture to sit for a period of time sufficient to form an organic acid; and, c. contacting an ore that contains nickel and magnesium with the organic acid formed in step b for a period of time to dissolve the nickel and form a salt solution containing a nickel salt and a magnesium salt.

2. The process of claim 1 wherein the mixture of step a is formed into a first heap.

3. The process of claim 1 wherein the ore that is contacted with the organic acid is formed into a heap prior to being contacted with the organic acid.

4. The process of claim 2 wherein the ore that is contacted with the organic acid is formed into a second heap prior to being contacted with the organic acid.

5. The process of claim 1 wherein the microorganism is selected from the group consisting of *Aspergillus niger*, Aaureus, Awamori, Carbonarius, Cinnamomeus, Clavatus, Fenicis, *Fonsecaeus foetidus, Fumarious luchensis,* Saitoi, Usamil, and Wentii, *Yarrowia lipolytica, Candida lipolytica, Candida guilliermondi* and mixtures thereof.

6. The process of claim 1 wherein the microorganism is *Aspergillus niger*.

7. The process of claim 1 wherein the organic acid is selected from the group of oxalic acid, humic acid, citric acid and mixtures thereof.

8. The process of claim 1 wherein the organic acid is citric acid.

9. The process of claim 1 wherein the nickel salt is nickel citrate and the magnesium salt is magnesium citrate.

10. The process of claim 9 wherein the magnesium citrate is recovered.

11. The process of claim 10 wherein the magnesium citrate is converted to citric acid and magnesium hydroxide.

12. The process of claim 11 wherein a portion of the citric acid is recycled and mixed with the microorganism, nutrient, and ore.

13. The process of claim 10 wherein the citrate is (a) re-acidified with an inorganic acid selected from the group of sulfuric acid and hydrochloric acid and (b) thereafter mixed with the microorganism, nutrient, and material.

14. The process of claim 1 further comprising separating the nickel salt from the magnesium salt.

15. The process of claim 14 wherein substantially pure nickel from the nickel salt is recovered.

16. The process of claim 1 wherein the nutrient is selected from the group consisting of molasses, sugar, beet sugar, cane sugar, dextrose hydrolyzed from corn, dextrose hydrolyzed from cornstarch, sucrose containing materials, and mixtures thereof.

17. A process for leaching an ore that contains nickel and magnesium comprising:

a. mixing the following to form a mixture i. a microorganism is capable of producing citric acid acid, wherein the microorganism is selected from the group consisting of *Aspergillus niger*, Aaureus, Awamori, Carbonarius, Cinnamomeus, Clavatus, Fenicis, *Fonsecaeus foetidus, Fumarious luchensis,* Saitoi, Usamil, and Wentii, *Yarrowia lipolytica, Candida lipolytica, Candida guilliermondi* and mixtures thereof, ii. a nutrient selected from the group consisting of molasses, sugar, beet sugar, cane sugar, dextrose hydrolyzed from corn, dextrose hydrolyzed from cornstarch, sucrose containing materials, and mixtures thereof, and iii. a material selected from the group consisting of a substrate, an ore that contains nickel and magnesium, and mixtures thereof;

b. allowing the mixture to sit for a period of time sufficient to form citric acid; and, c. contacting an ore that contains nickel and magnesium with the citric acid for a period of time to dissolve the nickel and form a salt solution containing a nickel citrate and a magnesium citrate.

18. The process of claim 17 wherein the mixture of step a is formed into a heap.

19. The process of claim 17 wherein the ore that is contacted with the citric acid is formed into a second heap prior to being contacted with the citric acid.

20. The process of claim 18 wherein the ore that is contacted with the citric acid is formed into a second heap prior to being contacted with the citric acid.

* * * * *